United States Patent
Shimura

(10) Patent No.: US 7,543,973 B2
(45) Date of Patent: Jun. 9, 2009

(54) LIGHT GUIDE PLATE, METHOD OF MANUFACTURING LIGHT GUIDE PLATE AND BACKLIGHT WITH THE LIGHT GUIDE PLATE

(75) Inventor: Takashi Shimura, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 169 days.

(21) Appl. No.: 11/787,650

(22) Filed: Apr. 17, 2007

(65) Prior Publication Data
US 2008/0068862 A1    Mar. 20, 2008

(30) Foreign Application Priority Data
Apr. 17, 2006  (JP)  ............... 2006-113428
Aug. 21, 2006  (JP)  ............... 2006-224603

(51) Int. Cl.
*F21V 7/04* (2006.01)
(52) U.S. Cl. .......... 362/619; 362/620; 362/625; 362/626
(58) Field of Classification Search ........... 362/619, 362/620, 625
See application file for complete search history.

(56) References Cited

U.S. PATENT DOCUMENTS

| | | | |
|---|---|---|---|
| 5,408,388 A | 4/1995 | Kobayashi et al. | |
| 6,659,615 B2 | 12/2003 | Umemoto | |
| 6,791,638 B2 | 9/2004 | Miyashita et al. | |
| 7,387,422 B2 * | 6/2008 | Won et al. | 362/620 |
| 2004/0004424 A1 | 1/2004 | Sakurai | |
| 2006/0279679 A1 | 12/2006 | Fujisawa et al. | |

FOREIGN PATENT DOCUMENTS

| | | | |
|---|---|---|---|
| JP | 5-127159 A | 5/1993 |
| JP | 9-101521 A | 4/1997 |
| JP | 2000-155225 A | 6/2000 |
| JP | 2000-180643 A | 6/2000 |
| JP | 2003-249109 A | 9/2003 |
| JP | 2004-6193 A | 1/2004 |
| JP | 2006-264071 | 10/2006 |

OTHER PUBLICATIONS

Shimura et al. U.S. patent application entitled 'Light Guide Plate, Method of Manufacturing Light Guide Plate, and Backlight Unit with the Light Guide Plate', U.S. Appl. No. 11/843,542, filed Aug. 22, 2007.

* cited by examiner

*Primary Examiner*—Stephen F Husar
(74) *Attorney, Agent, or Firm*—Brinks Hofer Gilson & Lione

(57) ABSTRACT

An edge-light type light guide plate 30 is provided and has a first surface 31 and a second surface 32 that are opposed to each other, and a peripheral edge surface extending between the peripheral edges of the first and second surfaces. A part of the peripheral edge surface is defined as a light entrance plane 30*a*. The first surface 31 has a series of parallel elongated convex surfaces 31*a* that have an arcuate cross-section and extend in a direction substantially perpendicularly intersecting the light entrance plane 30*a*. The second surface 32 has a series of parallel elongated concave surfaces 32*a* that have an arcuate cross-section and extend in a direction substantially perpendicularly intersecting the elongated convex surfaces 31*a* on the first surface.

17 Claims, 11 Drawing Sheets

LIGHT GUIDE PLATE, METHOD OF MANUFACTURING LIGHT GUIDE PLATE AND BACKLIGHT WITH THE LIGHT GUIDE PLATE

This application claims priority under 35 U.S.C. § 119 to Japanese Patent application No. JP2006-113428 filed on Apr. 17, 2006 and No. 2006-224603 filed Aug. 21, 2006, the entire contents of which are hereby incorporated by reference.

TECHNICAL FIELD

The present invention relates to backlight units for use in display devices such as liquid crystal display devices. More particularly, the present invention relates to a light guide plate used in an edge-light type lighting device and also relates to a backlight unit using the same.

RELATED PRIOR ART

Liquid crystal display devices have been widely used in personal computers, liquid crystal display television systems, electronic organizers, cellular phones, and other terminal display devices. A backlight unit is provided at the lower side of a liquid crystal display panel of such a liquid crystal display device to make the displayed image appear bright and sharp. The backlight unit often uses an edge-light type light guide plate with a view to achieving a thin backlight unit structure. In the edge-light type light guide plate, a light source is provided adjacent to a side edge surface of the light guide plate so that light from the light source enters the light guide plate through the side edge surface and is guided toward the inner part of the light guide plate. While traveling through the light guide plate, the light exits the upper surface of the light guide plate.

Japanese Patent Application Publication No. 2004-6193 discloses a liquid crystal display device having a backlight unit as shown in FIG. 22. In this liquid crystal display device, a backlight unit (lighting device) 8 housed in a casing 9 is provided at the lower side of a liquid crystal panel 1.

The backlight unit 8 has a light guide plate 6. Three LEDs (light-emitting diodes) 3 mounted on a substrate 7 are provided close to a side edge surface 6c of the light guide plate 6 in such a way that light-emitting surfaces 3a of the LEDs 3 face the side edge surface 6c. A diffuser sheet 26 is provided directly above a first surface (upper surface) 6a of the light guide plate 6 serving as a light exit surface. Two prism sheets 25 and 24 are stacked on the diffuser sheet 26, and another diffuser sheet 23 is stacked on the prism sheet 24. A reflective sheet 27 is provided directly below a second surface (lower surface) 6b of the light guide plate 6. A heat sink 5 is connected to the substrate 7 to dissipate heat generated from the LEDs 3. An adhesive sheet 28 with partly light reflecting and blocking effect is bonded to the lower surface of the liquid crystal panel 1 to effectively utilize illuminating light from the backlight unit 8.

Light emitted from the light-emitting surfaces 3a of the LEDs 3 enters the light guide plate 6 through the side edge surface 6c and travels through the light guide plate 6. While doing so, the light properly exits the first surface (upper surface) 6a of the light guide plate 6 under the action of the reflective sheet 27. The exiting light passes through the diffuser sheet 26, the two stacked prism sheets 25 and 24, and further through the diffuser sheet 23 to illuminate the liquid crystal panel 1 with a uniformly distributed quantity of light. The heat sink 5 keeps the whole liquid crystal display device at a uniform temperature to minimize unevenness of display brightness on the liquid crystal panel 1.

Meanwhile, various reflecting schemes have been devised for such a light guide plate to allow light from a light source to properly exit the upper surface thereof while guiding the light toward the inner part of the light guide plate. Japanese Patent Application Publication No. 2003-262735 discloses a light guide plate having reflecting means as shown in FIG. 23. That is, a light guide plate 12 has a multiplicity of sawtooth-shaped prisms 12b on the lower surface thereof (i.e. the surface opposite to the light exit surface) as reflecting means. The sawtooth-shaped prisms 12b are provided such that a first tilt angle θ1 of the prisms 12b is varied within the range of from 89.5° to 60° as the distance from a light source 11 increases, while a second tilt angle θ2 is kept constant so that the relationship of θ1>θ2 is satisfied.

Light guide plates are generally made by injection molding using resin materials excellent in heat resistance, moisture resistance, light-deterioration resistance, impact resistance, chemical resistance, etc. such as acrylic resins and polycarbonate resins. Injection molding process enables mass-production of light guide plates superior in accuracy.

Injection molding process, however, requires the light guide plate thickness to be greater than a certain value in order to allow the resin material to be appropriately filled in the molding tool. For example, many light guide plates used in cellular phones and the like are made with a thickness in the range of from 0.5 to 1.0 mm. The thickness of light guide plates can be somewhat reduced if they are injection-molded by using a large-sized injection molding machine with high injection pressure. Even in such a case, the thickness of light guide plates needs to be greater than a certain value. The use of a large-sized injection molding machine increases installation cost. Manufacture of light guide plates of different thickness needs a plurality of injection molds to be prepared therefor, resulting in an increase in mold cost.

The light guide plate provided with sawtooth-shaped prisms as reflecting means, which is disclosed in Japanese Patent Application Publication No. 2003-262735, enables light to be effectively guided toward the inner part of the light guide plate but suffers from the problem that directivity is imparted to light reflected by the prisms 12b, which is likely to cause luminance (brightness) unevenness. For this reason, one or two light diffuser sheets need to be used to eliminate brightness unevenness of exiting light from the light guide plate.

SUMMARY OF THE INVENTION

An object of the present invention is to solve the above-described problems with the conventional light guide plates.

The present invention provides an edge-light type light guide plate having a first surface and a second surface that are opposed to each other, and a peripheral edge surface extending between the peripheral edges of the first and second surfaces. A part of the peripheral edge surface is defined as a light entrance plane. The first surface has a series of parallel elongated convex surfaces of arcuate cross-section that extend substantially perpendicularly to the light entrance plane. The second surface has a series of parallel elongated concave surfaces of arcuate cross-section that extend substantially perpendicularly with respect to the convex surfaces on the first surface.

Thus, the edge-light type light guide plate has series of parallel elongated convex and concave surfaces as stated above. Therefore, light entering the light guide plate through the light entrance plane is guided toward the inner part thereof by the action of the convex surfaces, and light exiting the first or second surface is diffused by the actions of the concave and convex surfaces, whereby it is possible to minimize luminance unevenness on the surface from which light exits. In addition, the convex and concave surfaces are easier to be formed than the conventional sawtooth-shaped surfaces. Accordingly, it becomes possible to make a light guide plate thinner than the conventional light guide plates.

In addition, the present invention provides an edge-light type light guide plate having a first surface and a second surface that are opposed to each other, and a peripheral edge surface extending between the peripheral edges of the first and second surfaces. A part of the peripheral edge surface is defined as a light entrance plane. The first surface has a series of parallel-elongated convex surfaces of arcuate cross-section that extend substantially perpendicularly to the light entrance plane. The second surface has a series of parallel-elongated convex surfaces of arcuate cross-section that extend substantially perpendicularly with respect to the convex surfaces on the first surface.

This edge-light type light guide plate also offers advantageous effects similar to those of the above-described edge-light type light guide plate.

Specifically, the depths and pitches of the elongated concave surfaces may gradually increase with the concave surfaces being situated farther away from the light entrance plane.

With this arrangement, even if the quantity of light guided closer to the inner part away from the light source in the light guide plate decreases, the light can exit the light exit surface of the light guide plate efficiently, and luminance unevenness on the light exit surface can be minimized.

The edge-light type light guide plate may be made of a synthetic resin sheet. In this case, the convex and concave surfaces may be press-formed. Thus, the thickness of the light guide plate can be reduced considerably in comparison to the conventional light guide plates.

Specifically, the convex and concave surfaces may be formed by hot pressing.

In another specific example, the edge-light type light guide plate may have a resin sheet and UV (ultraviolet) curing resin coating layers provided on both surfaces of the resin sheet to form the first and second surfaces, and the convex and concave surfaces may be press-formed on the UV curing resin coating layers.

In addition, the present invention provides a light guide plate assembly having a multiplicity of edge-light type light guide plates arranged as stated above that are integrally formed adjacent to each other. In other words, a large-sized light guide plate capable of producing a multiplicity of edge-light type light guide plates is prepared, and this is cut into a plurality of desired edge-light type light guide plates.

In an embodiment of the present invention, the edge-light type light guide plate can be formed with a thickness not greater than 200 microns.

In addition, the present invention provides a light guide plate manufacturing method including the steps of: preparing a synthetic resin sheet having a first surface and a second surface that are opposed to each other; preparing a first forming die having a series of parallel elongated concave forming surfaces of arcuate cross-section; preparing a second forming die having a series of parallel elongated convex forming surfaces of arcuate cross-section; pressing the concave-shaped surfaces of the first forming die against the first surface to form on the first surface a series of parallel elongated convex surfaces of arcuate cross-section; and pressing the convex-shaped surfaces of the second forming die against the second surface at right angles to the elongated convex surfaces to form on the second surface a series of parallel elongated concave surfaces of arcuate cross-section.

In short, this method manufactures the light guide plate by press forming. Accordingly, the method takes a shorter time for forming than the conventional method using injection molding and enables the thickness of the light guide plate to be reduced to a considerable extent.

In addition, the present invention provides a light guide plate manufacturing method including the steps of: preparing a synthetic resin sheet having a first surface and a second surface that are opposed to each other; preparing a first forming die having a series of parallel elongated concave-shaped surfaces which have an arcuate cross-section; preparing a second forming die having a series of parallel elongated convex-shaped surfaces which have an arcuate cross-section; pressing the concave-shaped surfaces of the first forming die against the first surface to form on the first surface a series of parallel elongated convex surfaces which have an arcuate cross-section; and pressing the convex-shaped surfaces of the second forming die against the second surface at right angles to the series of parallel elongated concave forming surfaces of the first forming die to form on the second surface a series of parallel elongated concave surfaces which have an arcuate cross-section.

This method offers advantageous effects similar to those of the first-mentioned method.

Specifically, the first and second forming dies may be heated and pressed against the first and second surfaces, respectively.

More specifically, the first and second forming dies may be set to hold the synthetic resin sheet from both sides thereof to simultaneously form the convex surfaces on the first surface and the concave surfaces on the second surface.

In another specific example, the first and second forming dies may be rollers. In this case, the first and second rollers press the synthetic resin sheet while rotating to form the series of parallel-elongated convex and concave surfaces.

In another specific example, the light guide plate manufacturing method may be as follows. The step of preparing the synthetic resin sheet includes the steps of: feeding a resin sheet; forming a first UV curing resin coating layer defining the first surface on one side of the resin sheet; and forming a second UV curing resin coating layer defining the second surface on the other side of the resin sheet. The step of forming the series of parallel elongated convex surfaces includes the step of forming the series of parallel elongated convex surfaces on the first UV curing resin coating layer with the first forming die and thereafter irradiating the first UV curing resin coating layer with ultraviolet radiation to cure the first UV curing resin coating layer. The step of forming the series of parallel elongated concave surfaces includes the step of forming the series of parallel elongated concave surfaces on the second UV curing resin coating layer with the second forming die and thereafter irradiating the second UV curing resin coating layer with ultraviolet radiation to cure the second UV curing resin coating layer.

This method enables the convex and concave surfaces to be formed with a higher accuracy than in the case of performing merely press forming and also allows a thin light guide plate to be manufactured.

Specifically, the light guide plate manufacturing method may further include the steps of: feeding the sheet substrate as an elongated continuous member horizontally in the longitudinal direction thereof; forming a first UV curing resin coating layer on the sheet substrate being fed; pressing the series of parallel elongated concave forming surfaces of the first forming die formed as a roller against the first UV curing resin coating layer on the sheet substrate being fed while rotating the first forming die to form the series of parallel elongated convex surfaces on the first UV curing resin coating layer; forming a second UV curing resin coating layer on the sheet substrate being fed; and pressing the series of parallel elongated convex forming surfaces of the second forming die formed as a roller against the second UV curing resin coating layer on the sheet substrate being fed while rotating the second forming die to form the series of parallel elongated concave surfaces on the second UV curing resin coating layer.

The method may further include the step of cutting the synthetic resin sheet having the series of parallel elongated convex and concave surfaces formed as stated above to obtain a rectangular light guide plate having a side edge surface defined by a surface extending in a direction perpendicularly intersecting the series of parallel elongated convex surfaces.

The above-described method enables light guide plates to be mass-produced efficiently and can also be adapted for multi-product small-lot production. Light guide plates of desired size can be manufactured by merely preparing one set of forming dies.

In addition, the present invention provides a backlight unit having the above-described light guide plate and a light source set adjacent to the light entrance plane of the light guide plate so that light from the light source enters the light guide plate through the light entrance plane. In the backlight unit, the above-described first surface is defined as a light exit surface. Because of using the light guide plate arranged as stated above, the backlight unit has minimized luminance unevenness on the light exit surface.

BRIEF DESCRIPTION OF THE DRAWINGS

FIG. 2a is a diagram showing the light guide plate in FIG. 1 as seen in the direction of the arrow 2a.

FIG. 19a is a diagram showing the light guide plate in FIG. 18 as seen in the direction of the arrow 19a.

DETAILED DESCRIPTION OF THE INVENTION

Figure 1:
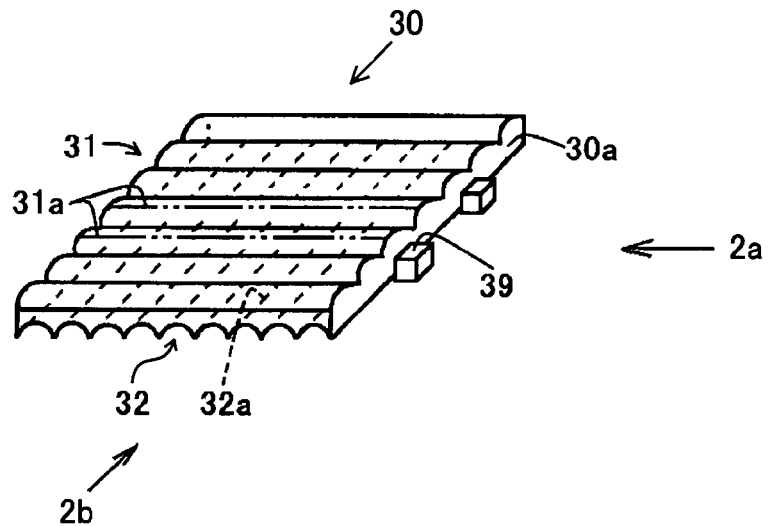
FIG. 1 is a perspective view of a light guide plate according to an embodiment of the present invention.
Figure 2A:
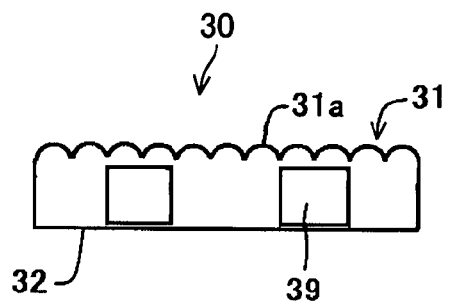
Figure 2B:
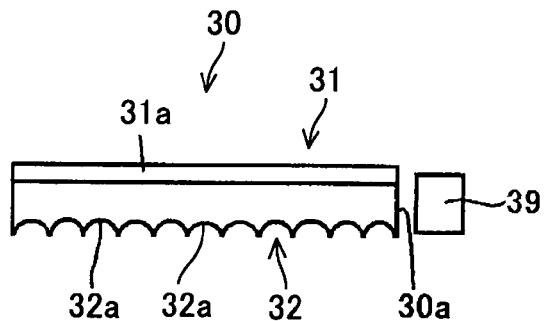
FIG. 2b is a diagram showing the light guide plate in FIG. 1 as seen in the direction of the arrow 2b.

FIGS. 1 to 2b show an edge-light type rectangular light guide plate 30 according to the present invention.

The light guide plate 30 has a first surface (upper surface as viewed in the figures) 31, a second surface (lower surface) 32 opposed to the first surface 31, and four side edge surfaces extending between the peripheral edges of the first and second surfaces 31 and 32. One of the side edge surfaces is defined as a light entrance plane 30a. The first surface 31 has a series of elongated convex surfaces 31a extending parallel to each other. The second surface 32 has a series of elongated concave surfaces 32a extending in a direction perpendicularly intersecting the convex surfaces 31a on the first surface 31. The light entrance plane 30a extends in a direction perpendicularly intersecting the elongated convex surfaces 31a. The convex surfaces 31a and concave surfaces 32a have arcuate cross-sections, respectively.

A light source 39 is set at a position adjacent to the light entrance plane 30a so that light from the light source 39 enters the light guide plate 30 through the light entrance plane 30a. In the illustrated example, two LEDs (light-emitting diodes)

are shown as the light source 39. The light source 39, however, may be an elongated cold-cathode tube or the like.

Figure 3A:
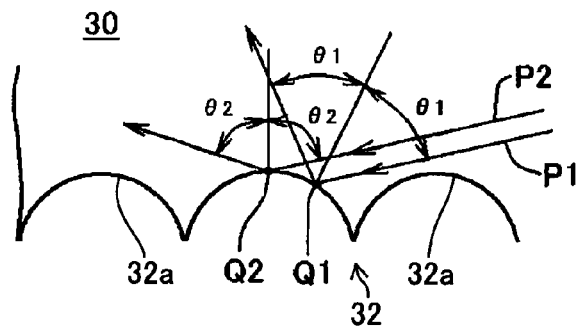
FIG. 3a is a diagram illustrating the action of elongated concave surfaces provided on a second surface of the light guide plate shown in FIG. 1.
Figure 3B:
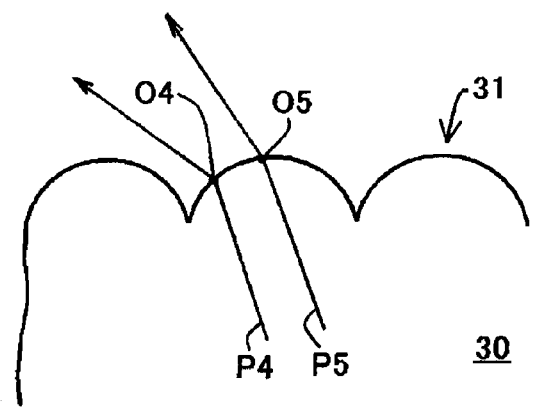
FIG. 3b is a diagram illustrating the action of elongated convex surfaces provided on a first surface of the light guide plate shown in FIG. 1.
Figure 4:
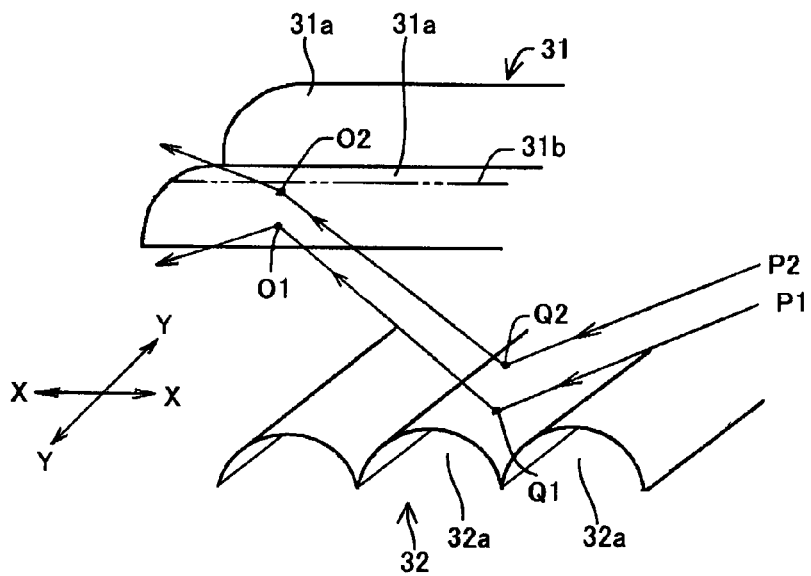
FIG. 4 is a diagram illustrating actions available when the elongated convex surfaces on the first surface of the light guide plate in FIG. 1 and the elongated concave surfaces on the second surface thereof are arranged to extend in respective directions perpendicularly intersecting each other.

FIGS. 3 to 5 show the actions of the convex surfaces 31a and concave surfaces 32a provided on the first surface 31 and second surface 32, respectively.

Let us assume, for example, that, as shown in FIG. 3a, two parallel rays P1 and P2 of light from the light source 39 being transmitted in the light guide plate 30 are incident at respective positions Q1 and Q2 on a concave surface 32a at angles of incidence greater than the critical angle. On this assumption, the incident light rays P1 and P2 undergo total internal reflection. In this case, however, the angles of incidence and reflection of the rays P1 and P2 with respect to the concave surface 32a are different from each other as shown by reference symbols θ1 and θ2. Accordingly, light rays reflected from the positions Q1 and Q2 are not parallel to each other but dispersed to form a divergent light beam as a whole. The dispersed reflected light is partly transmitted through the convex surfaces 31a on the first surface 31 to exit to the outside. The rest of the dispersed reflected light is reflected again by the convex surfaces 31a to travel toward the inner part of the light guide plate 30. As shown in FIG. 3b, on the convex surfaces 31a also, if parallel rays P4 and P5 are incident at different positions O4 and O5, the incident light rays are refracted and traveling directions of light rays are varied.

The above-described action of light on the convex surface 31a and concave surface 32a contributes to making the luminance uniform over the first surface of the light guide plate. When a point light source such as an LED light source is used, configurations mentioned above minimizes the reduction of luminance on the first surface that is likely to occur at regions between the adjacent LEDs.

FIG. 4 shows actions available when the elongated convex surfaces 31a on the first surface 31 and the elongated concave surfaces 32a on the second surface 32 are arranged to extend in respective directions perpendicularly intersecting each other. Let us assume that, in FIG. 4, the longitudinal direction of the elongated convex surfaces 31a is an X direction, and the longitudinal direction of the elongated concave surfaces 32a is a Y direction. It is also assumed that two mutually parallel rays P1 and P2 traveling in the X direction are incident at different positions Q1 and Q2 on a concave surface 32a at angles greater than the critical angle, and the reflected rays P1 and P2 are incident at positions O1 and O2 on a convex surface 31a on the first surface at angles not greater than the critical angle. In this case, the rays P1 and P2 reflected at the positions Q1 and Q2 follow respective optical paths generally in the X direction. In this regard, if the position O1 is located near the ridge of the elongated convex surface 31a and the position O2 is away from the ridge, the ray P1 incident at the position O1 undergoes refraction. Consequently, the ray P1 travels generally in the X direction while changing direction toward the Y direction to a considerable extent as it exits to the outside from the elongated convex surface 31a. The ray P2 incident at the position O2 only slightly changes direction toward the Y direction but is refracted toward the X direction as it exits to the outside from the elongated convex surface 31a. As will be understood from the above, if the elongated convex surfaces 31a on the first surface 31 and the elongated concave surfaces 32a on the second surface 32 are arranged to extend in respective directions perpendicularly intersecting each other, light entering the light guide plate exits the first surface with a wide angle of divergence, and hence a uniform luminance distribution can be obtained on the first surface.

Next, the action of the elongated convex surfaces 31a on the first surface that extend at right angles to the light entrance plane 30a, which serves as a light-receiving surface, will be explained with reference to FIGS. 5a and 5b.

Figure 5A:
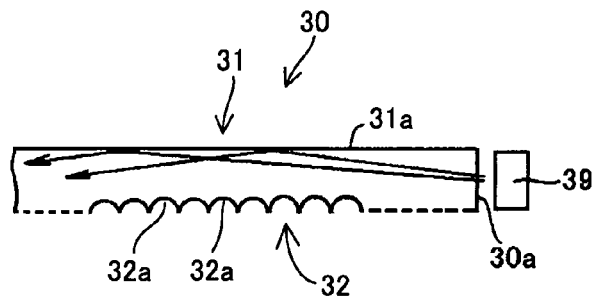
FIG. 5a is a diagram showing a longitudinal section along the elongated convex surfaces on the first surface of the light guide plate in FIG. 4 to explain the action of the elongated convex surfaces.
Figure 5B:
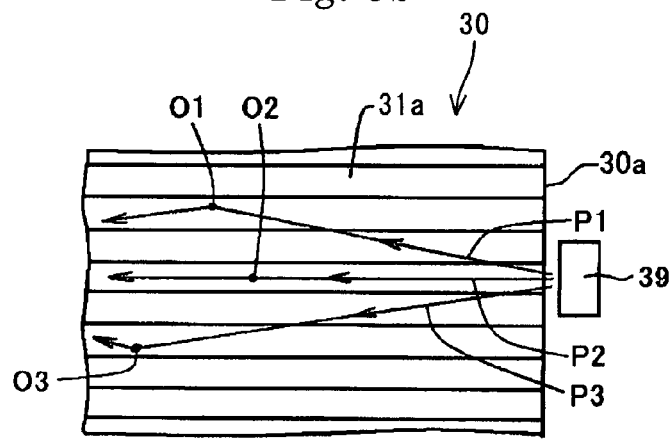
FIG. 5b is a diagram showing the light guide plate in FIG. 5a as seen from the top thereof to explain the action of the elongated convex surfaces on the first surface.

In FIG. 5a, light from the light source 39 enters the light guide plate 30 through the light-receiving surface 30a. Of the incident light, a ray P2 parallel to the longitudinal direction of the elongated convex surfaces 31a on the first surface as viewed in FIG. 5b and rays P1 and P3 that are at angles to the longitudinal direction are all incident on the elongated convex surfaces 31a at respective positions O1, O2 and O3. If the angle of incidence is greater than the critical angle, the rays P1, P2 and P3 are totally reflected to travel toward the inner part of the light guide plate 30. Thus, light can be guided sufficiently as far as an inner region which is away from the light entrance plane in the light guide plate 30 that light cannot readily reach, and it is possible to increase the luminance on the first surface, which serves as a light exit surface, at a region corresponding to the inner region of the light guide plate 30.

In the present invention, if the convex surfaces 31a extending at right angles to the light-receiving surface 30a are changed to concave surfaces, light will converge on the joints between the adjacent concave surfaces. Consequently, portions of the first surface as a light exit surface where light converges have a particularly high luminance, resulting in a luminance unevenness.

As will be understood from the above, received light can be readily guided toward the inner part of the light guide plate 30 by arranging the elongated convex surfaces 31a on the first surface 31 and the elongated concave surfaces 32a on the second surface 32 as stated above. Because exiting light from the light guide plate 30 is changed in direction and, a uniform luminance distribution can be attained over the light exit surface.

Although in the light guide plate 30 of this embodiment the elongated convex surfaces 31a on the first surface 31 and the elongated concave surfaces 32a on the second surface 32 have arcuate cross-sections, the cross-sections of these convex surface 31a and concave surface 32a may be formed from quadratic curves such as an elliptic configuration. This also offers advantageous effects similar to the above.

Although in the foregoing description the first surface is used as a light exit surface, the second surface may also be used as a light exit surface as will be described later.

The light guide plate 30 can be formed by a hot pressing process which is described below with reference to FIGS. 6 to 8.

Figure 6:
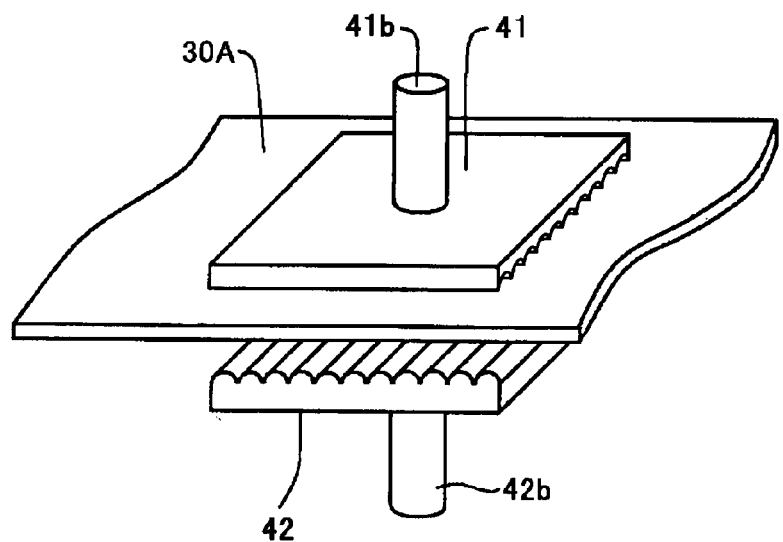
FIG. 6 is a perspective view illustrating a method of manufacturing the light guide plate shown in FIG. 1.
Figure 7:
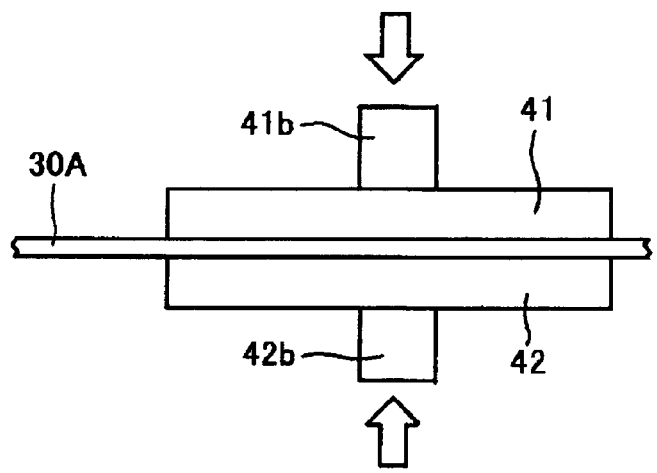
FIG. 7 is a side view showing the way in which press forming is performed with a combination of upper and lower press dies in the manufacturing method illustrated in FIG. 6.

In FIG. 6, a resin sheet 30A is a material used to make a light guide plate. The resin sheet 30A may be an acrylic resin sheet, a polycarbonate resin sheet, a polyester resin sheet, a polyimide resin sheet, etc.

Figure 8A:
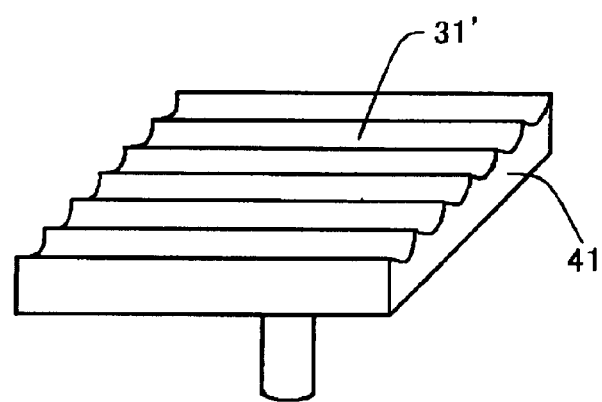
FIG. 8a is a perspective view showing the die configuration of the upper press die in FIG. 6.
Figure 8B:
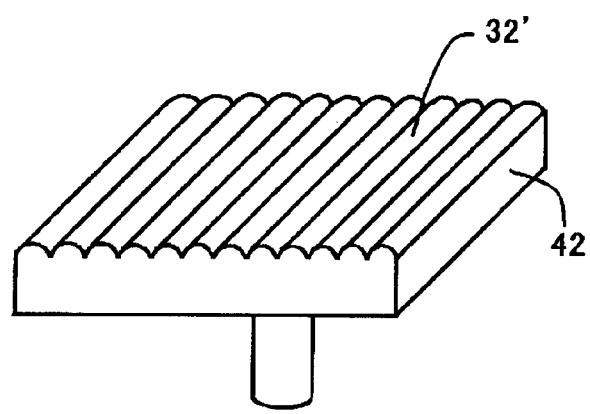
FIG. 8b is a perspective view showing the die configuration of the lower press die in FIG. 6.

An upper press die 41 and a lower press die 42 are set to hold the resin sheet 30A from the upper and lower sides thereof. In the illustrated example, the upper die 41 and lower press die 42 are adapted to form the above-described elongated convex surfaces 31a on the upper surface of the resin sheet 30A and the elongated concave surfaces 32a on the lower surface thereof. More specifically, as shown in FIG. 8a, the press surface of the upper press die 41 has a press surface 31' configured to enable the above-described elongated convex surfaces 31a to be formed by pressing the press surface 31' against the resin sheet 30A. The lower press die 42 has, as shown in FIG. 8b, a press surface 32' configured to enable the elongated concave surfaces 32a to be formed by pressing the press surface 32' against the resin sheet 30A. The press surface configurations are simple and hence easy to form by using a numerically-controlled milling machine, grinding machine or the like.

The upper press die 41 and the lower press die 42 are equipped with heaters or other heating devices to press the resin sheet 30A heated to a temperature not lower than the softening point thereof. For example, the acrylic resin sheet has a softening point in the range of from 100° to 110° C. The polycarbonate resin sheet has a softening point in the range of from 130° to 140° C. The polyester resin sheet has a softening point in the range of from 240° to 245° C. Therefore, these resin sheets are heated to a temperature not lower than their softening points.

In FIG. 6, the upper press die 41 and the lower press die 42 are attached to a pressing machine (not shown) through connecting rods 41b and 42b, respectively.

In press forming operation, the upper press die 41 and the lower press die 42, which have been heated, are pressed so as to hold the resin sheet 30A from the upper and lower sides thereof. After elongated convex surfaces 31a and elongated concave surfaces 32a have been formed, the upper press die 41 is raised, while the lower press die 42 is lowered, and the resin sheet 30A is removed from between the upper and lower press dies 41 and 42 by a stock feeder. The resin sheet 30A is larger in size than the actual light guide plate. After the elongated convex surfaces 31a and the elongated concave surfaces 32a have been formed as stated above, the resin sheet 30A is cut into a light guide plate of desired size. Light guide plates of various sizes can be formed by merely making the upper press die 41 and the lower press die 42. Thus, the die making cost can be reduced in comparison to the conventional injection molding process.

When the above-described hot pressing process is used, the thickness of the light guide plate 30 is determined substantially by the thickness of the resin sheet 30A. Accordingly, it is possible to readily make a light guide plate of desired thickness, e.g. 0.1 to 0.3 mm, which is very thin in comparison to the conventional light guide plates.

Figure 9:
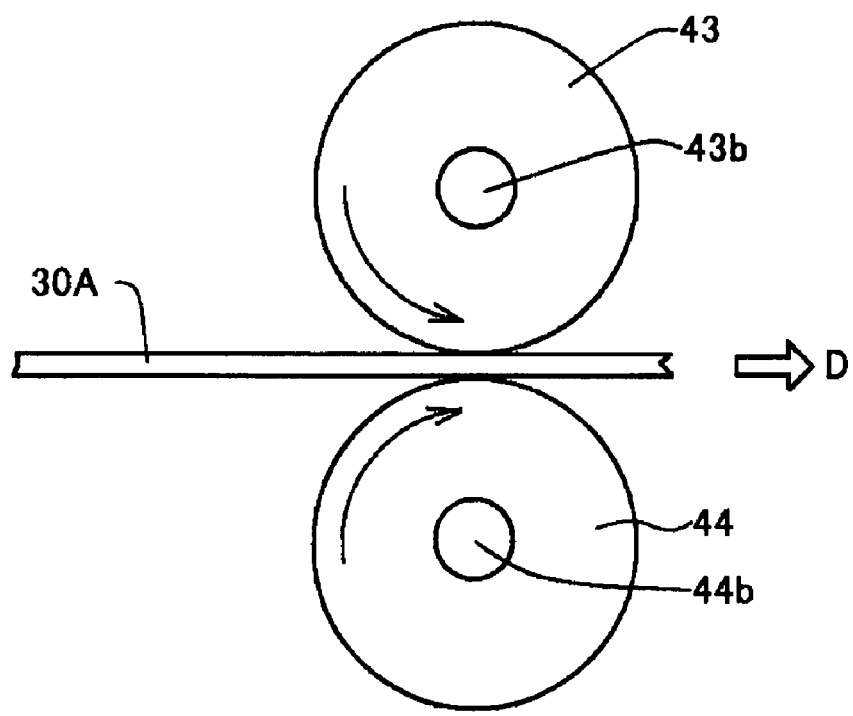
FIG. 9 is an explanatory view illustrating a method of manufacturing the light guide plate according to the present invention by rollers.
Figure 10A:
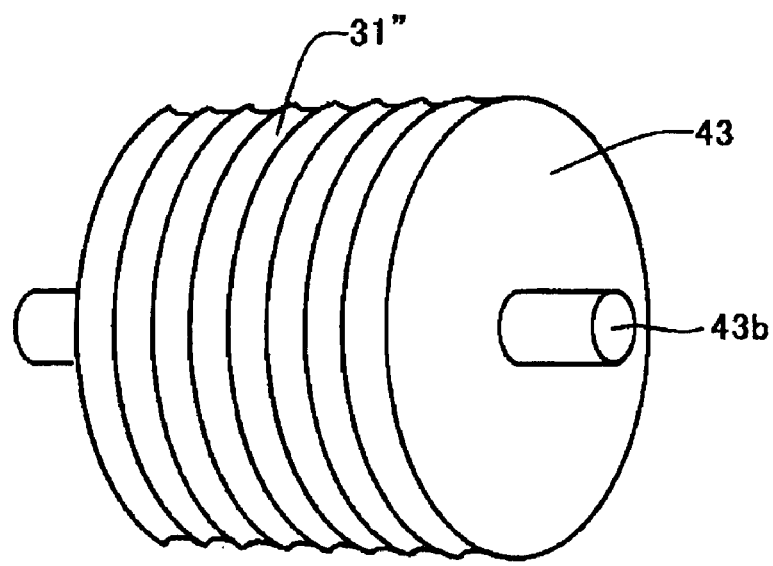
FIG. 10a is a perspective view of an upper roller shown in FIG. 9.
Figure 10B:
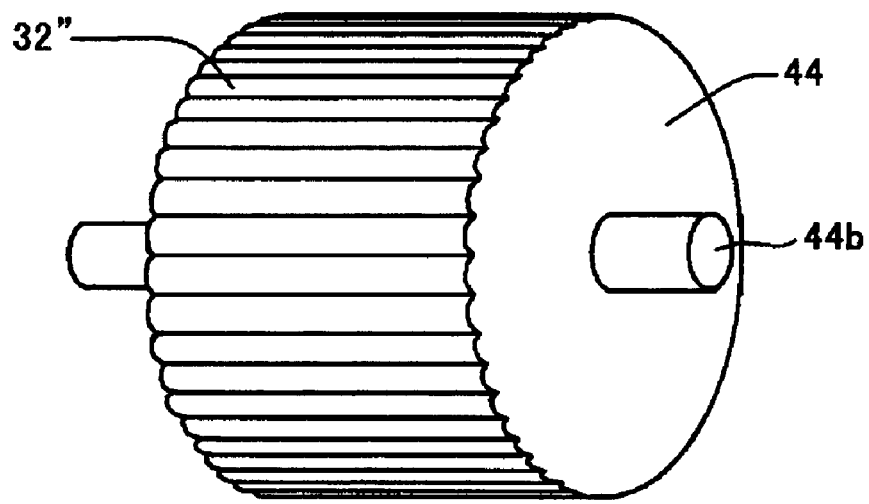
FIG. 10b is a perspective view of a lower roller shown in FIG. 9.
Figure 11:
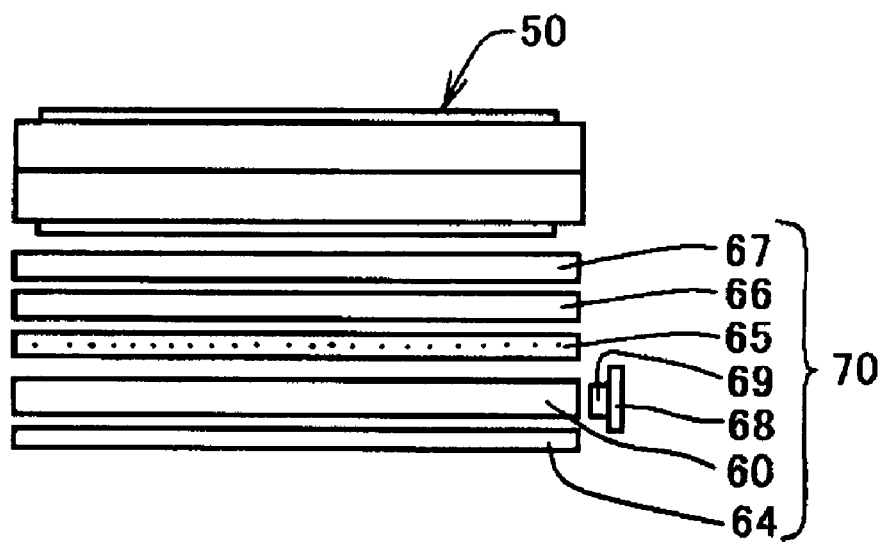
FIG. 11 is a side view of a backlight unit provided in a liquid crystal display device according to an embodiment of the present invention.

FIGS. 9 to 10b show a hot pressing process using an upper roller 43 and a lower roller 44.

The upper roller 43 has, as shown in FIG. 10a, an outer peripheral surface formed into a forming surface 31" that enables the above-described elongated convex surfaces 31a to be formed by press-rolling the upper roller 43 on the resin sheet 30A. The lower roller 44 has, as shown in FIG. 10b, an outer peripheral surface formed into a forming surface 32" that enables the above-described elongated concave surfaces 32a to be formed by press-rolling the lower roller 44 on the resin sheet 30A. The upper roller 43 and the lower roller 44 are connected to a rotational drive apparatus through respective connecting shafts 43b and 44b. As shown in FIG. 9, the upper roller 43 and the lower roller 44 rotate with the resin sheet 30A held therebetween. In this way, the resin sheet 30A is conveyed in the direction indicated by the arrow D, thereby forming elongated convex surfaces 31a on the upper surface (as viewed in FIG. 9) of the resin sheet 30A and elongated concave surfaces 32a on the lower surface thereof. Except for the above-described point, the pressing process is substantially the same as the process described above with reference to FIGS. 6 to 8b. Therefore, a detailed description thereof is omitted herein.

FIGS. 11 to 14 show a backlight unit 70 using the above-described light guide plate to illuminate a liquid crystal display device 50.

The backlight unit 70 is provided at the lower side of the liquid crystal display device 50 (i.e. at the side thereof opposite to the side thereof where image display is performed). The backlight unit 70 has a reflective sheet 64, a light guide plate 60, a light diffuser sheet 65, a first prism sheet 66, and a second prism sheet 67, which are stacked in the order mentioned from the bottom thereof. The backlight unit 70 further has a light source 69 provided adjacent to the light guide plate 60. The light source 69 comprises LEDs mounted on a light source wiring board 68. Although in FIG. 11 the constituent parts of the backlight unit 70 are depicted as being stacked with a gap between each pair of adjacent parts, they may be superimposed on one another without a gap therebetween.

Figure 12:
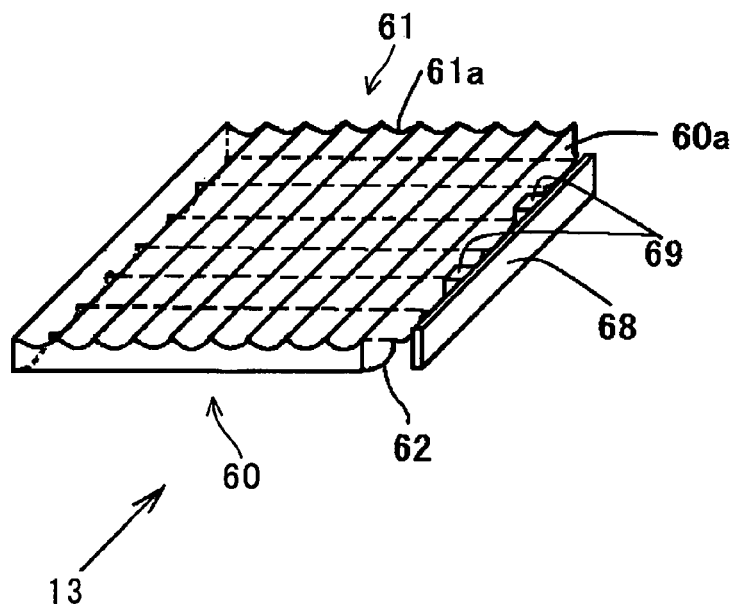
FIG. 12 is a perspective view of a light guide plate and a light source provided in the liquid crystal display device shown in FIG. 11.
Figure 13:
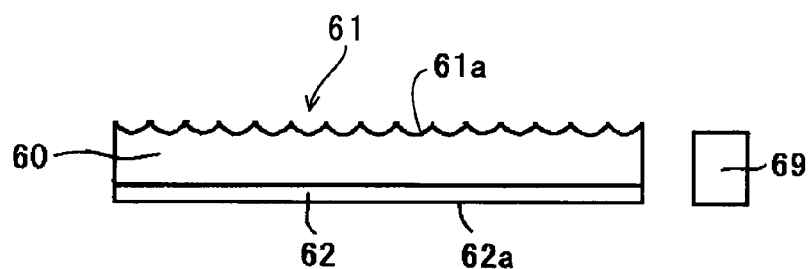
FIG. 13 is a diagram showing the light guide plate in FIG. 12 as seen in the direction of the arrow 13.

The light guide plate 60 constituting the backlight unit 70 has, as shown in FIGS. 12 and 13, a series of elongated concave surfaces 61a on a light exit surface (upper surface as viewed in FIGS. 12 and 13) 61. The elongated concave surfaces 61a are the same as the above-described elongated concave surfaces and provided to extend parallel to a light-receiving surface 60a adjacent to the light source 69. On a lower surface 62 of the light guide plate 60 are provided a series of elongated convex surfaces 62a that are the same as the above-described elongated convex surfaces. The elongated convex surfaces 62a extend in a direction perpendicularly intersecting the elongated concave surfaces 61a.

Figure 14:
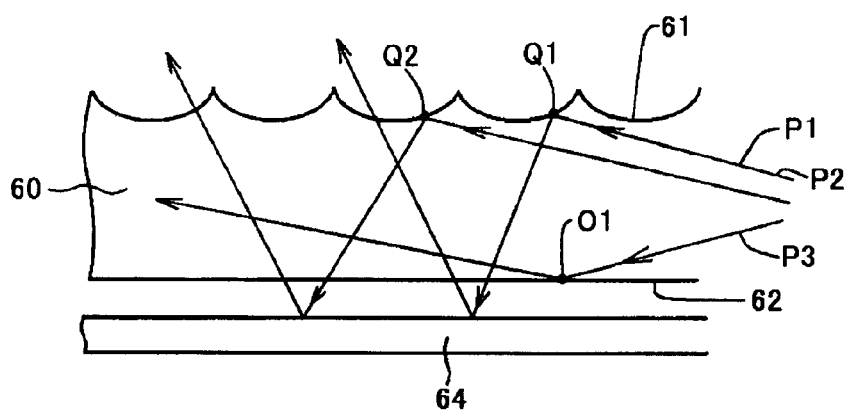
FIG. 14 is an explanatory view schematically illustrating an action available when a reflective sheet is provided at the lower side of the light guide plate in FIG. 12.

The following is an illustration of the behavior of direct incident light from the light source 69 in the light guide plate 60 arranged as stated above. As shown in FIG. 14, incident light rays P1 and P2 traveling toward the elongated concave surfaces 61a impinge thereon at respective positions Q1 and Q2, for example. The rays P1 and P2 are reflected by the elongated concave surfaces 61a and transmitted through the elongated convex surfaces 62a. The transmitted rays P1 and P2 are incident on the reflective sheet 64 and reflected therefrom. The reflected rays P1 and P2 pass through the light guide plate 60 to exit from the elongated concave surfaces 61a. Meanwhile, a light ray P3 directed toward the elongated convex surfaces 62a is reflected at a position O1 to travel toward the inner part of the light guide plate 60. The actions of the elongated concave and convex surfaces described above with reference to FIGS. 3a to 5b also take place in this light guide plate 60 in the same way as the above. Thus, the uniformity of luminance on the light exit surface is improved. A detailed description thereof, however, is omitted herein.

The light guide plate 60 is made of a polycarbonate resin sheet having a thickness of approximately 250 μm. The elongated concave surfaces 61a have a depth of 3 to 25 μm and a pitch of 100 to 300 μm. The elongated convex surfaces 62a have a height of 5 to 20 μm and a pitch of 40 to 180 μm.

The reflective sheet 64 may be made of a resin sheet provided with a metal film of high light reflectance. For example, the reflective sheet 64 may be made of a PET (polyethylene terephthalate) sheet on which aluminum metal is evaporated. The reflective sheet 64 may be formed with a thickness in the range of from 70 to 120 μm.

The light diffuser sheet 65 may be made from a transparent resin, such as an acrylic or polycarbonate resin, having silica particles dispersed therein. The light diffuser sheet 65 may be formed with a thickness in the range of from 70 to 120 μm. The light diffuser sheet 65 is provided for the purpose of further diffusing light exiting the light guide plate 60 to achieve a uniform luminance distribution.

The first prism sheet 66 and the second prism sheet 67 are prism sheets of the same configuration. The first sheet 66 and second prism sheet 67, however, are arranged with their respective ridges extending perpendicular to each other to increase the lighting intensity. Both the prism sheets 66 and 67 are formed by using sheets having a thickness of 50 to 300 μm.

The light source 69 is formed by using LEDs. A necessary number of LEDs are disposed close to the light-receiving surface 60a of the light guide plate 60. The light source 69 comprising LEDs is mounted on the light source wiring board 68, which is a flexible printed circuit board (FPC). It should be noted that the light source 69 is not necessarily limited to LEDs.

With the above-described arrangement, the backlight unit 70 can be formed in a very thin structure having a thickness of 0.6 to 0.8 mm, which is close to a half of the thickness of the conventional backlight units, and yet provides a favorably uniform luminance distribution. That is, the uniformity of luminance on the light exit surface for illuminating the displayed image on the liquid crystal display device is substantially equal to that of the conventional backlight units.

Figure 15:
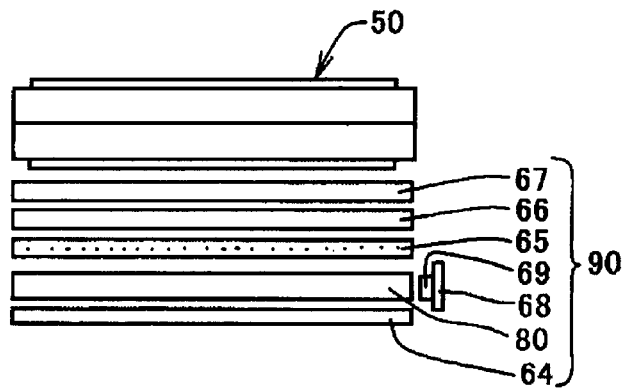
FIG. 15 is a side view of a backlight unit provided in a liquid crystal display device according to another embodiment of the present invention.
Figure 16:
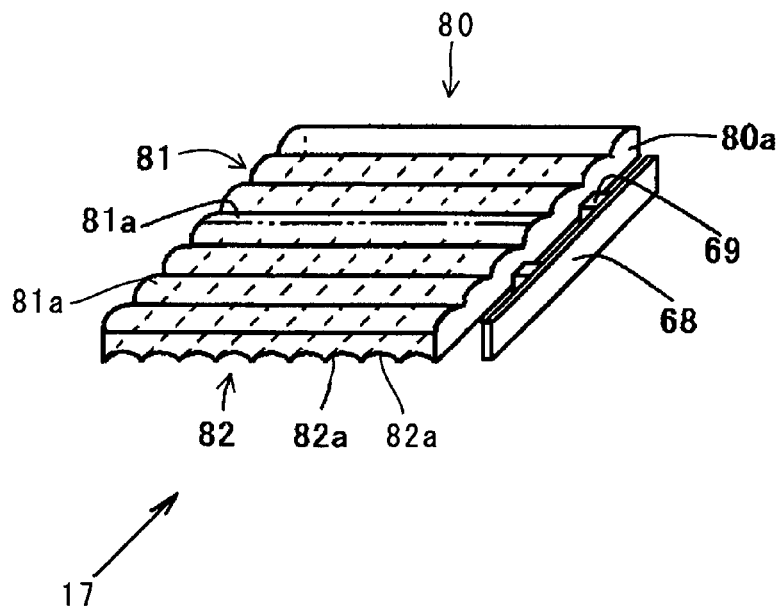
FIG. 16 is a perspective view of a light guide plate and a light source in the liquid crystal display device shown in FIG. 15.
Figure 17:
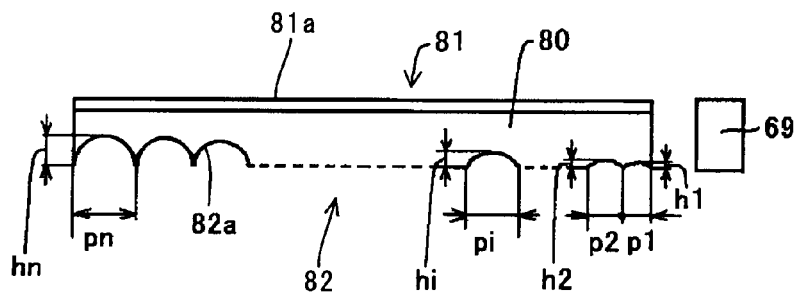
FIG. 17 is a diagram showing the light guide plate in FIG. 16 as seen in the direction of the arrow 17.

FIGS. 15 to 17 show a backlight unit 90 according to another embodiment of the present invention.

As shown in FIG. 15, the backlight unit 90 has basically the same structure as that of the above-described backlight unit 70. Therefore, a detailed description thereof is omitted herein.

A light guide plate 80 constituting the backlight unit 90 has, as shown in FIG. 16, a series of elongated convex surfaces 81a on a light exit surface (upper surface of the light guide plate 80) 81. The elongated convex surfaces 81a are the same as the above-described elongated convex surfaces and provided to extend at right angles to a light-receiving surface 80a. On a lower surface 82 of the light guide plate 80 are provided a series of elongated concave surfaces 82a that are the same as the above-described elongated concave surfaces. The elongated concave surfaces 82a extend in a direction perpendicularly intersecting the elongated convex surfaces 81a. The feature of the light guide plate 80 resides in that, as shown in FIG. 17, the pitch p and depth h of the elongated concave surfaces 82a gradually increase with the concave surfaces being situated farther away from the light source 69. That is, the pitch p of the elongated concave surfaces 82a is set so as to satisfy the relationship of $p1<p2<\ldots<pi<\ldots<pn$, where p1 is the pitch of the concave surface 82a closest to the light source 69; p2 is the pitch of the second concave surface 82a; pi is the pitch of the i-th concave surface 82a; and pn is the pitch of the last concave surface 82a. The depth h of the elongated concave surfaces 82a is set so as to satisfy the relationship of $h1<h2<\ldots<hi<\ldots<hn$, where h1 is the depth of the concave surface 82a having the pitch p1; h2 is the depth of the concave surface 82a having the pitch p2; hi is the depth of the concave surface 82a having the pitch pi; and hn is the depth of the last concave surface 82a having the pitch pn.

With the above-described structure, the area of the elongated concave surfaces 82a gradually increases as the distance from the light source 69 increases toward the inner part of the light guide plate 80. Accordingly, the distribution of exiting light quantity from the light guide plate 80 is well balanced over the entire area of the light exit surface. Thus, a backlight of high luminance uniformity can be obtained.

Figure 18:
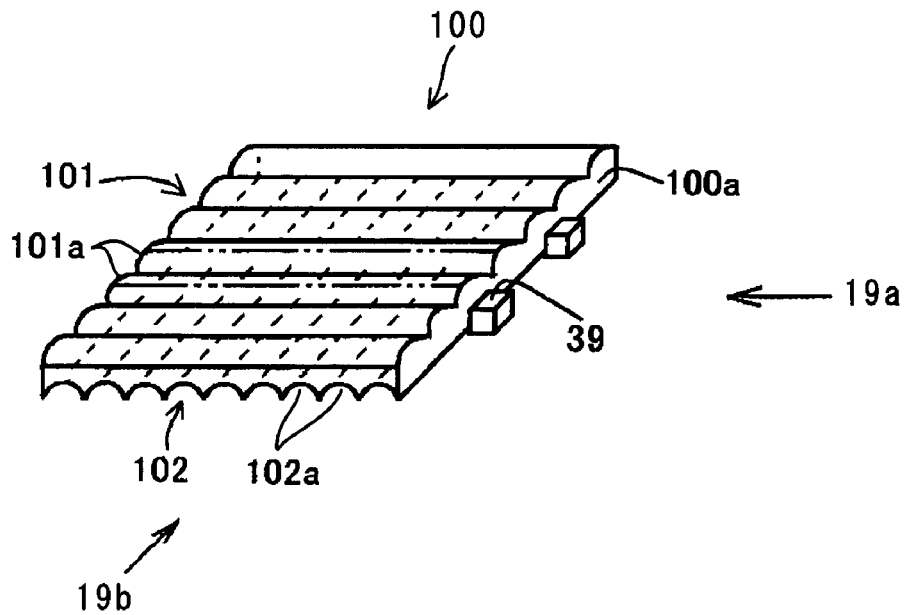
FIG. 18 is a perspective view of a light guide plate according to still another embodiment of the present invention.
Figure 19A:
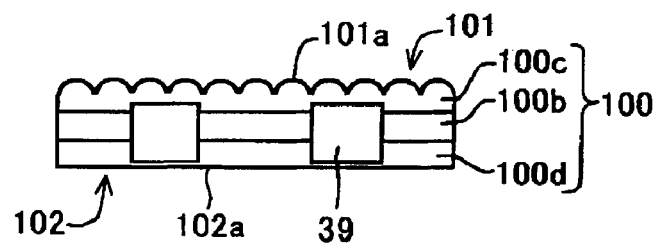
Figure 19B:
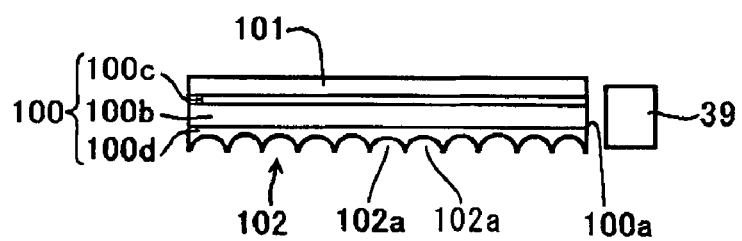
FIG. 19b is a diagram showing the light guide plate in FIG. 18 as seen in the direction of the arrow 19b.
Figure 20:
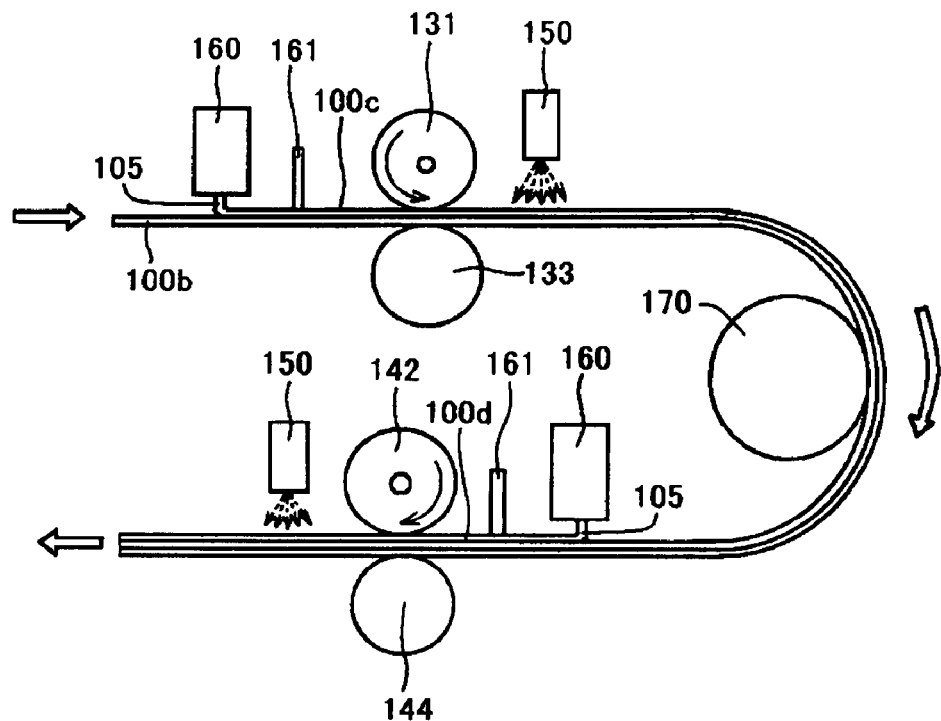
FIG. 20 is a diagram illustrating another example of the light guide plate manufacturing method according to the present invention.

FIGS. 18 to 20 show a light guide plate 100 different in structure from the above-described light guide plate 80.

The light guide plate 100 has, as shown in FIG. 18, a series of elongated convex surfaces 101a provided on an upper surface 101 thereof to extend at right angles to a light-receiving surface 100a. On a lower surface 102 of the light guide plate 100 are provided a series of elongated concave surfaces 102a that extend in a direction perpendicularly intersecting the convex surfaces 101a.

More specifically, the light guide plate 100 is, as shown in FIGS. 19a and 19b, formed in a three-layer structure having a resin sheet 100b, a first coating layer 100c provided on the upper surface of the resin sheet 100b, and a second coating layer 100d provided on the lower surface of the resin sheet 100b. The first coating layer 100c is formed with a series of elongated convex surfaces 101a, and the second coating layer 100d is formed with a series of elongated concave surfaces 102a. The first coating layer 100c and the second coating layer 100d are made from UV (ultraviolet) curing resin coatings applied to the upper and lower surfaces of the sheet substrate 100b. The first coating layer 100c is formed with a series of elongated convex surfaces 101a by rollers and then irradiated with ultraviolet radiation to cure the UV curing resin material. Similarly, the second coating layer 100d is formed with a series of elongated concave surfaces 102a by rollers and then irradiated with ultraviolet radiation to cure the UV curing resin material.

Examples of usable UV curing resin materials are acrylic, epoxy, urethane, urethane acrylate and epoxy acrylic resins. Materials favorably usable for the resin sheet 100b are an acrylic resin, a polycarbonate resin, etc.

The light guide plate 100 is formed through the following steps.

First, the resin sheet 100b is fed in the direction indicated by the arrow in FIG. 20. The resin sheet 100b is coated with a UV curing resin 105 by a coating applicator 160. The applied UV curing resin 105 is formed into a coating layer 100c of predetermined thickness by a blade 161. The blade 161 may be a plate or a very fine mesh net, for example. The resin sheet 100b having the coating layer 100c is then passed between a roller 131 and a support roller 133. The roller 131 is of the same specifications as those of the upper roller 43, which has been explained in connection with FIG. 10a. Consequently, a series of elongated convex surfaces 101a are formed on the coating layer 100c. Next, the resin sheet 100b is passed under an ultraviolet irradiator 150 using a high-pressure mercury UV lamp, whereby the UV curing resin is cured. Next, the resin sheet 100b is turned over by a roller 170 and then coated with a UV curing resin 105 by another coating applicator 160. The applied UV curing resin 105 is formed into a coating layer 100d of predetermined thickness by a blade 161. Further, the sheet substrate 100b is passed between a second roll die 142 and a support roller 144. The second roller 142 is of the same specifications as those of the lower roller 44, which has been explained in connection with FIG. 10b. Consequently, a series of elongated concave surfaces 102a are formed on the coating layer 100d. Next, the resin sheet 100b is passed under another ultraviolet irradiator 150, whereby the UV curing resin is cured.

Figure 21:
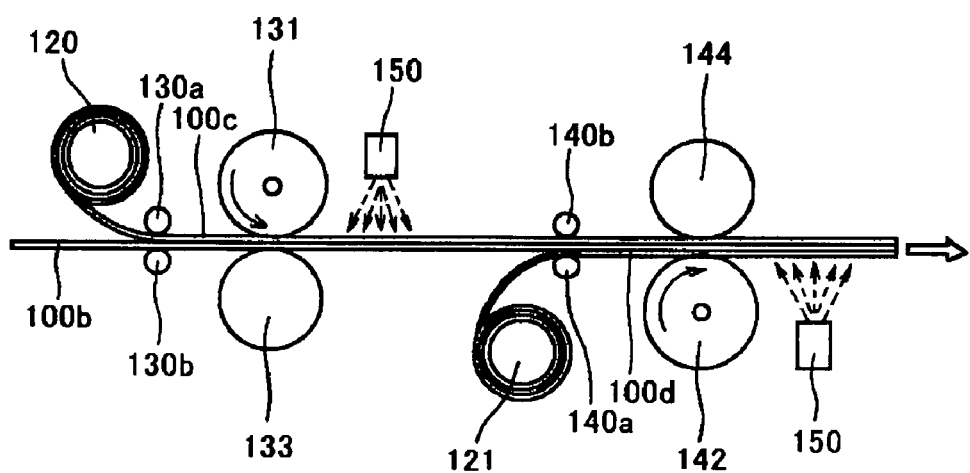
FIG. 21 is a diagram illustrating still another example of the light guide plate manufacturing method according to the present invention.
Figure 22:
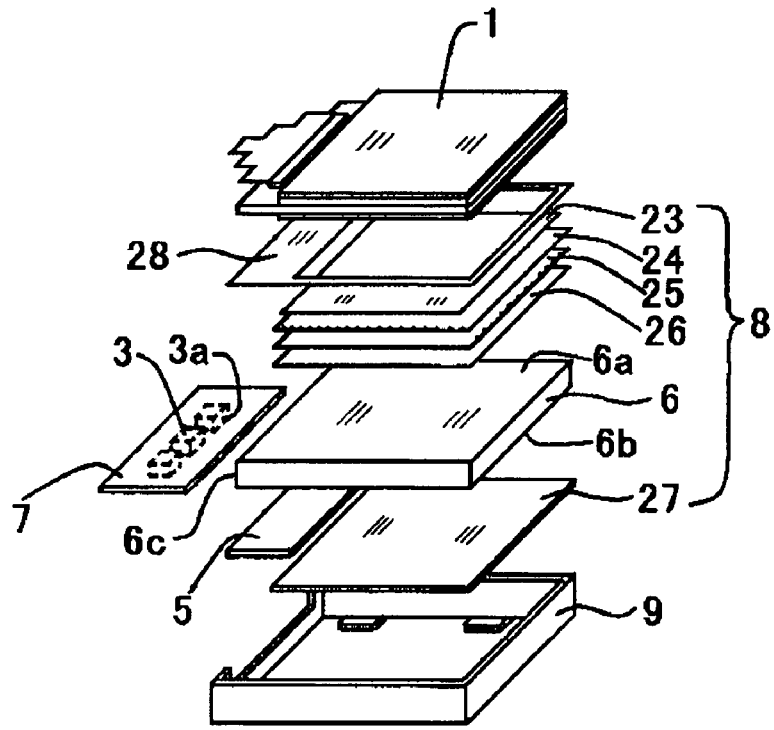
FIG. 22 is an exploded perspective view of a liquid crystal display device having a backlight unit according to a conventional technique.
Figure 23:
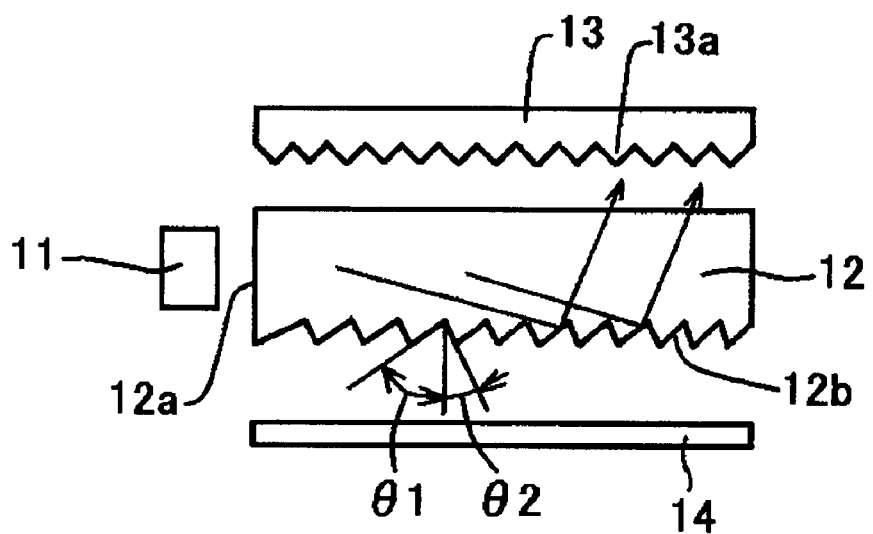
FIG. 23 is a fragmentary sectional view of an essential part of a light guide plate according to another conventional technique.

FIG. 21 shows a method of forming coating layers by a process different from the process in which UV curing resin coatings are applied to form coating layers.

The manufacturing method shown in FIG. 21 forms coating layers by sticking UV curing resin laminate films to the resin sheet 100b. The resin sheet 100b, after the formation of the coating layers, is formed into a sheet-shaped light guide plate through the same steps as those explained above in connection with FIG. 20.

More specifically, according to this method, first, the resin sheet 100b and the first coating layer 100c are stuck to each other. That is, the resin sheet 100b being fed and the first coating layer 100c being fed from a roller 120 are welded with pressure between revolving rollers 130a and 130b. Next, the resin sheet 100b is passed between a first roller 131 and a support roller 133, and thus the first roller 131 is pressed against the first coating layer 100c while rotating it, thereby forming a series of elongated convex surfaces on the first coating layer 100c. Further, the series of elongated convex surfaces 101a thus formed are irradiated with ultraviolet radiation by an ultraviolet irradiator 150 so as to be cured.

Next, a second coating layer 100d is fed to the resin sheet 100b from a roller 121 of the second coating layer 100d, and a series of elongated concave surfaces 102a are formed on the second coating layer 100d by using rolls 140a and 140b, a combination of a lower roller 142 and a support roller 144, and an ultraviolet irradiator 150 in the same way as in the case of the first coating layer 100c.

Although rollers are used to form series of elongated convex and concave surfaces in this embodiment, press dies are also usable to form these surfaces.

The invention claimed is:

1. An edge-light type light guide plate comprising:
   a first surface and a second surface that are opposed to each other; and
   a peripheral edge surface extending between peripheral edges of said first surface and second surface, a part of said peripheral edge surface being defined as a light entrance plane;
   wherein said first surface has a series of parallel elongated convex surfaces of arcuate cross-section that extend in a direction substantially perpendicularly with respect to said light entrance plane; and
   said second surface has a series of parallel elongated concave surfaces of arcuate cross-section that extend substantially perpendicularly with respect to said convex surfaces on said first surface.

2. An edge-light type light guide plate according to claim 1, wherein depths and pitches of said elongated concave surfaces gradually increase with the concave surfaces being situated farther away from said light entrance plane.

3. An edge-light type light guide plate according to claim 1, which is made from a synthetic resin sheet, wherein said convex surfaces and concave surfaces are press-formed.

4. An edge-light type light guide plate according to claim 1, which is made from a synthetic resin sheet, wherein said convex surfaces and concave surfaces are formed by hot pressing.

5. An edge-light type light guide plate according to claim 1, which has:
   a sheet substrate; and
   ultraviolet curing resin coating layers provided on both surfaces of said sheet substrate to form said first surface and second surface;
   wherein said convex surfaces and concave surfaces are press-formed on said ultraviolet curing resin coating layers.

6. A light guide plate aggregation having a multiplicity of said edge-light type light guide plates according to claim 1 that adjoin to one another and integrally formed.

7. An edge-light type light guide plate according to claim 1, which has a thickness not greater than 200 microns.

8. A backlight unit comprising:
   said light guide plate of claim 1; and
   a light source set adjacent to the light entrance plane of said light guide plate so that light from said light source enters said light guide plate through said light entrance plane;
   wherein said first surface is defined as a light exit surface.

9. A light guide plate manufacturing method comprising the steps of:
   providing a synthetic resin sheet having a first surface and a second surface that are opposed to each other;
   providing a first forming die having a series of parallel elongated concave-shaped surfaces of arcuate cross-section;
   providing a second forming die having a series of parallel elongated convex-shaped surfaces of arcuate cross-section;
   pressing said concave-shaped surfaces of said first forming die against said first surface to form on said first surface a series of parallel elongated convex surfaces of arcuate cross-section; and
   pressing said convex-shaped surfaces of said second forming die against said second surface at right angles to said elongated convex surfaces on said first surface to form on said second surface a series of parallel elongated concave surfaces of arcuate cross-section.

10. A light guide plate manufacturing method according to claim 9, further comprising:
    the step of cutting said synthetic resin sheet having said series of parallel elongated convex surfaces and series of parallel elongated concave surfaces to obtain a rectangular light guide plate having a side edge surface defined by a surface extending in a direction perpendicularly intersecting said series of parallel elongated convex surfaces.

11. A light guide plate manufacturing method comprising the steps of:
    providing a synthetic resin sheet having a first surface and a second surface that are opposed to each other;
    providing a first forming die having a series of parallel elongated concave-shaped surfaces of arcuate cross-section;
    providing a second forming die having a series of parallel elongated convex-shaped surfaces of arcuate cross-section;
    pressing said concave-shaped surfaces of said first forming die against said first surface to form on said first surface a series of parallel elongated convex surfaces of arcuate cross-section; and
    pressing said convex-shaped surfaces of said second forming die against said second surface at right angles to said series of parallel elongated convex surfaces on said first surface to form on said second surface a series of parallel elongated concave surfaces of arcuate cross-section.

12. A light guide plate manufacturing method according to claim 11, wherein said first forming die and second forming die are heated and pressed against said first surface and second surface, respectively.

13. A light guide plate manufacturing method according to claim 11, wherein said first forming die and second forming die are set to hold said synthetic resin sheet from both opposite sides thereof to simultaneously form the convex surfaces on said first surface and the concave surfaces on said second surface.

14. A light guide plate manufacturing method according to claim 11, wherein said first forming die and second forming die are rollers, which are adapted to press from both opposite sides of said synthetic resin sheet while rotating to form said series of parallel elongated convex surfaces and series of parallel elongated concave surfaces.

15. A light guide plate manufacturing method according to claim 11, wherein said step of providing said synthetic resin sheet includes the steps of:
    feeding a resin sheet;
    forming a first ultraviolet curing resin coating layer defining said first surface on one side of said resin sheet; and
    forming a second ultraviolet curing resin coating layer defining said second surface on the other side of said resin sheet;
    wherein said step of forming said series of parallel elongated convex surfaces includes the step of forming said series of parallel elongated convex surfaces on said first ultraviolet curing resin coating layer with the first forming die and thereafter irradiating said first ultraviolet curing resin coating layer with ultraviolet radiation to cure said first ultraviolet curing resin coating layer; and said step of forming said series of parallel elongated concave surfaces includes the step of forming said series of parallel elongated concave surfaces on said second ultraviolet curing resin coating layer with the second forming die and thereafter irradiating said second ultraviolet curing resin coating layer with ultraviolet radiation to cure said second ultraviolet curing resin coating layer.

16. A light guide plate manufacturing method according to claim 15, further comprising the steps of:

feeding said resin sheet as an elongated continuous member horizontally in a longitudinal direction thereof;

forming a first ultraviolet curing resin coating layer on said resin sheet being fed;

pressing said series of parallel elongated concave-shaped surfaces of said first forming die formed as a roller against said first ultraviolet curing resin coating layer on said sheet substrate being fed while rotating said first forming die to form said series of parallel elongated convex surfaces on said first ultraviolet curing resin coating layer;

forming a second ultraviolet curing resin coating layer on said sheet substrate being fed; and pressing said series of parallel elongated convex-shaped surfaces of said second forming die formed as a roller against said second ultraviolet curing resin coating layer on said sheet substrate being fed while rotating said second forming die to form said series of parallel elongated concave surfaces on said second ultraviolet curing resin coating layer.

17. A light guide plate manufacturing method according to claim 11, further comprising:

the step of cutting said synthetic resin sheet having said series of parallel elongated convex surfaces and series of parallel elongated concave surfaces to obtain a rectangular light guide plate having a side edge surface defined by a surface extending in a direction perpendicularly intersecting said series of parallel elongated convex surfaces.

* * * * *